United States Patent [19]

Greenstreet et al.

[11] Patent Number: 5,120,206

[45] Date of Patent: Jun. 9, 1992

[54] GEAR METERING PUMP FOR COMPOUNDED ELASTOMERIC MATERIAL

[75] Inventors: Arthur W. Greenstreet, Clinton; Joseph C. Norka, Akron, both of Ohio

[73] Assignee: Bridgestone/Firestone, Inc., Akron, Ohio

[21] Appl. No.: 682,036

[22] Filed: Apr. 8, 1991

[51] Int. Cl.$^5$ ............................ F04C 2/18; F04C 15/00
[52] U.S. Cl. ...................................... 418/70; 418/102; 418/181; 418/206
[58] Field of Search ................ 418/70, 102, 134, 181, 418/206

[56] References Cited

U.S. PATENT DOCUMENTS

| | | | |
|---|---|---|---|
| 1,785,386 | 12/1930 | McIntyre | 418/181 |
| 2,481,560 | 9/1949 | Bakewell | 418/70 |
| 3,876,349 | 4/1975 | Svensson | 418/181 |
| 4,439,120 | 3/1984 | Berggren | 418/181 |
| 4,737,087 | 4/1988 | Hertell | 418/206 |

OTHER PUBLICATIONS

Advertising Brochure-Thermorex Polymer Pump Paramco Inc., 1464 W. Waterloo Rd., Barberton, OH 44203.

Primary Examiner—John J. Vrablik
Attorney, Agent, or Firm—Ernst H. Ruf

[57] ABSTRACT

A gear metering pump for delivering precise amounts of a compounded elastomeric material into a die. The gear pump has a housing formed with a hollow interior chamber containing a pair of rotating meshing gears mounted on shafts, one of which is power driven, for passing controlled quantities of the compounded material out of the chamber and into the die. A side plate is removably mounted on the housing and encloses an open side of the chamber and is moved between open and closed positions by fluid pressure cylinders mounted on the housing to provide ready access into the chamber for cleanout. A first bearing assembly for the gear shafts is mounted on the removable side plate and retains the gears mounted thereon for removing the gears from within the chamber along with the side plate. Outlet openings are formed in the removable side plate and in an opposite fixed side plate adjacent the shafts and bearings, permitting small quantities of the compounded material to flow between the shafts and bearings and out of the openings for lubrication of the bearings. The drive shaft passes out of the housing through an enlarged opening and is free of any end seal with the housing to reduce heat buildup.

11 Claims, 6 Drawing Sheets

GEAR METERING PUMP FOR COMPOUNDED ELASTOMERIC MATERIAL

BACKGROUND OF THE INVENTION

1. Technical Field

The invention relates to gear metering pumps and in particular to gear metering pumps for moving a predetermined amount of a compounded elastomeric material from the output of an extruder into a forming die. More particularly, the invention relates to such a gear metering pump which enables rapid cleanout of the interior chamber and meshing gears and lubrication of the gear shafts in a simpler, compact and lighter weight construction.

2. Background Information

Gear pumps are well known and widely used in the plastics and fiber industry. They are generally made by encasing a set of meshing gears within a close fitting casing or housing which is formed with feed and discharge ports. The material being transferred, fills the spaces between the gear teeth and as the gears turn, a volume element of the fluid material is trapped between flanks of adjacent gear teeth by close tolerances of housing envelope vs. tooth crests and ends. This volume element is positively transported to the discharge outlet of the chamber where it is displaced by meshing of opposing teeth. Thus, gear pumps are identified as positive displacement devices.

Gear pumps are generally classified by the services provided, such as metering, pressure boosting and volume transfer, as well as by the materials handled, such as polymers or low viscosity or inviscid liquids. Metering and pressure pumps are precision machines with exceedingly small internal clearances. Polymer metering pumps were developed primarily for synthetic fiber extrusion. Transfer pumps tend to have larger clearances for low friction at high RPM and allows fluid to slip or leak back to the feed port if the outlet is plugged. Certain of these prior art gear pumps include recycling relief valves to prevent excess pressure Most known gear pumps are lubricated by the fluid being pumped or transferred therethrough. The need to positively force polymeric fluids through the bearings has been met by several various designs present today in the gear metering pump industry. Some of these prior art metering pumps have gear diameters two or more times the shaft diameters such that a pumping action is created by the twisting action of the gear end face vs. the housing sidewall which provides an effect referred to in the polymer industry as a necktie effect. Lubricant flow depends more on clearance, pump speed and polymer rheology than it does on pressures and is self-stabilizing. Pumps usually are assembled with slightly insufficient clearance so initial sidewall wear is rapid. However, increased clearance at the gear faces, pumps more lubricant so wear rate decreases. Even so metering pumps are usually removed for cleaning and maintenance every few weeks. Most transfer pumps depend more on internal pressures to force lubricating polymer into the bearings. Flow through the bearings may be assisted by spiral grooving of the shaft or sleeves.

Early gear pumps allowed a small lubricant stream to pass through the bearings and leak outside the pump. This was not only undesirable but became unacceptable with the advent of dangerous fiber spinning solvents and fluids that could seize the pump shaft when they dried or froze. Absolute shaft seals were then developed and pumps were internally ported to return the bearing lubricant to the feed stream.

Gear pumps designed for polymers, especially gear metering pumps, are difficult to disassemble for cleaning and maintenance because parts must be designed for high strength as well as very tight fit, and usually are held together by the stiff polymer being transferred thereby. Maintenance on these polymer gear metering pumps usually requires various wrenches, mallets, prybars, gear puller and arbor presses. Very often a separate or spare pump is required to be maintained to restore production while the other gear pump is taken from the production line for maintenance.

A unique problem encountered in extruding profiles which will then be assembled into tires, is the myriad of different elastomeric compounds which must be used. To avoid contamination of one compound with another, extrusion lines may be cleaned twenty or more times per day.

The present invention relates to the use of gear pumps for a compounded elastomeric material. Such material, which hereinafter may be referred to as the compound, includes high-molecular weight elastomeric polymers which makes the compound very viscous and somewhat elastic, thereby creating extreme extrusion pressures and stresses. Such compound will contain solid reinforcing particles, such as carbon and/or silica, which makes it abrasive and which increases its viscosity. It also will contain curatives which make it thermosetting (vulcanizing) and scorch sensitive. Also upon cessation of shear, the compound assumes the properties of a solid. These properties make such a compound difficult for use with gear metering pumps.

The recycling of the material being passed through the gear metering pump used as the lubricant, is unsatisfactory where the material is such a compounded elastomeric material, due to the above described properties and particularly due to the risk of the compound vulcanizing and plugging the channels and ports through which the lubricating streams are transferred back to the main feed stream of material. Likewise, lubrication is uncertain in startup, especially when the extrusion head is empty or the amount of initial lubricant is insufficient for proper lubrication of the bearings. Also a problem exists where the material is not recycled but is discharged through torturous passages which easily become plugged.

Another problem present in gear metering pumps, especially for metering of compounded elastomeric material, is that the use of a positive seal for the power driven shaft of the meshing gear, as it exits the gear pump housing, creates a substantial heat problem. The creation of such heat is not a problem in extruding most fibers and films but is critical when the material is such a compounded elastomeric material. Control of the temperature of the compound is critical to ensure it is at a high enough temperature for extrusion through the adjacent die, yet not too high to cause partial vulcanization. It has been found that shaft seals can provide as much as 50% of the heat, which is added to the compound being metered by the meshing gears of the pump, thus adding to the heat control problem.

Therefore, the need exists for a gear metering pump for use in metering a compounded elastomeric material, which eliminates the generation of heat by the use of positive shaft seals, which enables access to be gained easily to the gear chamber and meshing gears for cleanout, and which enables the compound to be used as the lubricant without the problem of plugging of the lubricant flow channels or ports.

SUMMARY OF THE INVENTION

Objectives of the invention include providing an improved gear metering pump for a compounded elastomeric material which provides more reliable lubrication by elimination of the relatively long thin lubricant discharge ports heretofore used in prior gear metering pumps, yet which enables the compound being metered to be the lubricant.

A further objective of the invention is to provide such a gear metering pump which eliminates the need for positive seals on the drive shaft at the exit location from the pump housing, thereby reducing the temperature control problems of the pump and compound moving therethrough.

Another objective is to provide such a gear pump which enables rapid and easy cleanout during compound changes by merely removing a lightweight side plate from the main pump housing simultaneously with the removal of the meshing gears from the internal housing cavity, so as to provide complete access to the interior of the housing for ready removal of the remaining compound.

Still another objective of the invention is to provide such a gear pump which is of a reduced weight and bulk in contrast to the heretofore known metering pumps thereby reducing cost, since it eliminates the external positive seal for the drive shaft, and eliminates internal torturous lubrication return ports and channels heretofore required on the end plates of the pumps.

A still further objective of the invention is to provide such a gear pump which includes a cutter mechanism either stationary or rotatable, located adjacent to the discharge opening where the elastomeric lubricating material exits the pump housing, which prevents the discharge lubricant from completely filling and blocking the discharge openings.

These objectives and advantages are obtained for the improved gear metering pump of the invention, the general nature of which may be stated as a gear metering pump for a compounded elastomeric material which includes a housing having an internal gear chamber and a material inlet and outlet communicating with said chamber; a first side plate removably mounted on the housing and enclosing an open side of the housing chamber; a pair of meshing gears rotatably mounted on the first side plate and located within the chamber for moving a metered amount of the compound from the inlet to the outlet of the chamber; power means connected to the first side plate for removing the side plate from the housing and the gears from within the chamber upon actuation of the power means so as to provide access to the gears and housing chamber; bearing means mounted within the housing for rotatably mounting the pair of gears within the chamber; and port means communicating with the bearing means for enabling a controlled quantity of the compound to pass through the bearing means and out of said port means for lubricating the bearing means.

BRIEF DESCRIPTION OF THE DRAWINGS

A preferred embodiment of the invention, illustrative of the best mode in which applicants have contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
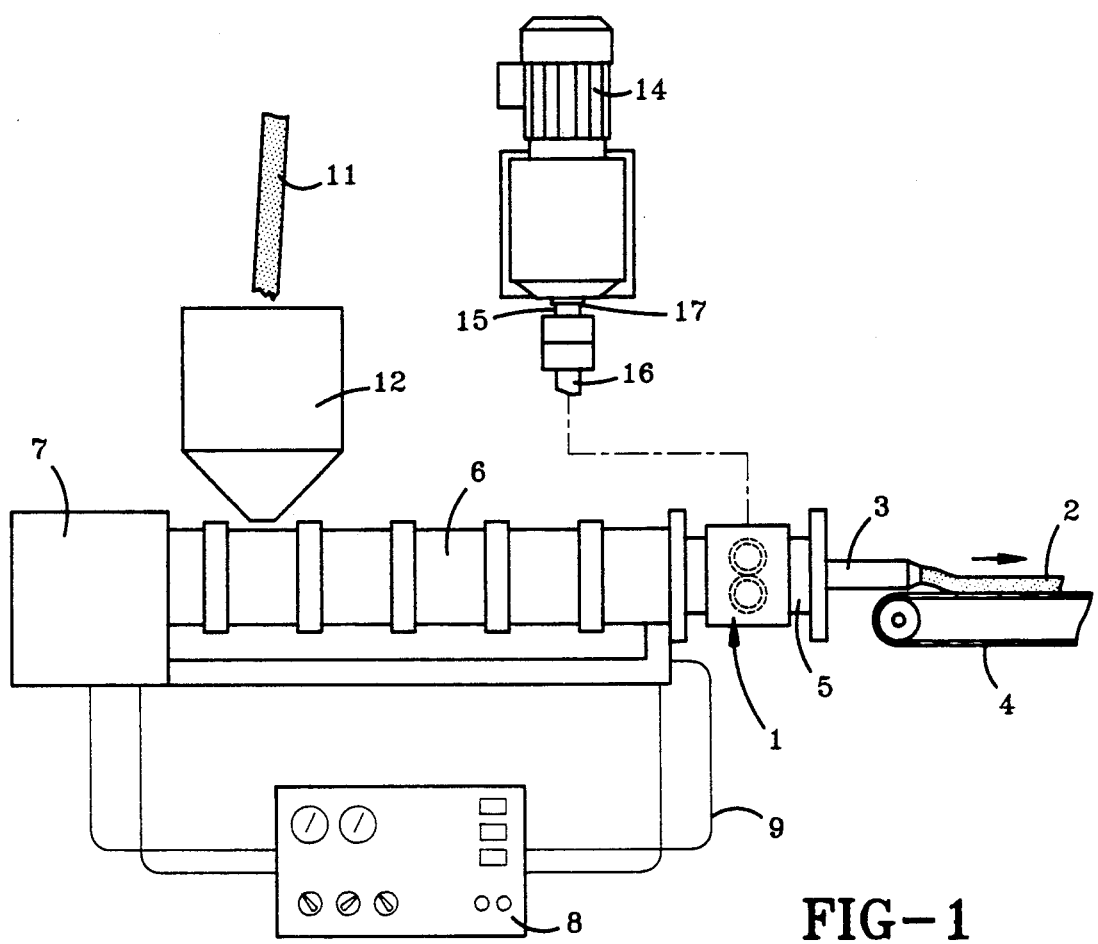
FIG. 1 is a diagrammatic view of an elastomeric extrusion system containing the improved metering pump of the invention.

The improved gear metering pump of the invention is indicated generally at 1, and is shown in FIG. 1. FIG. 1 illustrates a type of extrusion system for producing accurately profiled strips 2 of an extruded compounded elastomeric material, which after leaving an extrusion die 3, are carried by a power driven conveyor 4 for cooling and transfer to storage or a work station. Pump 1 is mounted between the inlet of an extrusion head 5 and the outlet of a feed extruder 6. Extruder 6 may have various designs and configurations but generally consists of a hollow barrel having an internal feed screw in which the screw is revolved by a power driven transmission assembly 7. Various temperatures and pressures within feed extruder 6 are monitored and controlled at an appropriate control panel 8 through various signal supply lines 9. Strips of compounded elastomeric material 11 are fed into extruder 6 through an input chute 12 where the compounded material is heated and mixed as it moves along extruder 6 prior to being discharged into gear pump 1.

Gear pump 1 preferably is driven by a usual electric motor 14 having its drive shaft 15 coupled to an input shaft 16 through a drive coupling 17 in a manner well known in the art. Motor 14 and its drive shaft connection with the drive shaft of the gear pump are shown in a broken away 90° oriented position in FIG. 1 for clarity.

The various components of the extrusion system discussed above and shown in FIG. 1 may vary without affecting the concept of the invention and is illustrative of only one type of system in which the improved gear metering pump may be incorporated.

Figure 7:
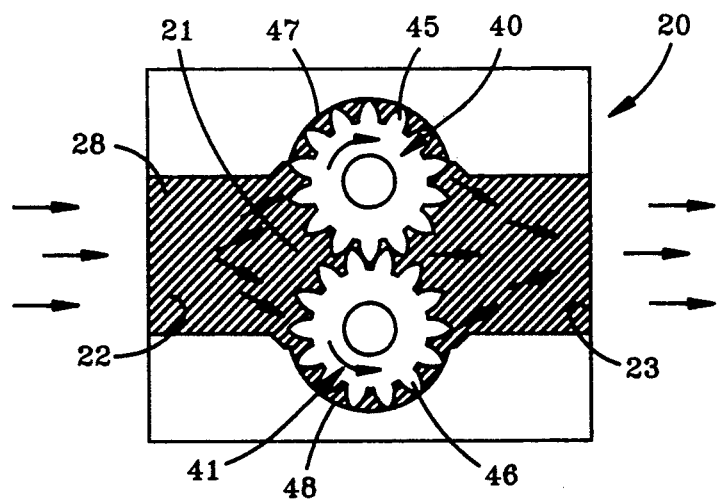
FIG. 7 is a diagrammatic view showing the movement of the elastomeric material through the meshing gears of the improved pump of the invention.
Figure 2:
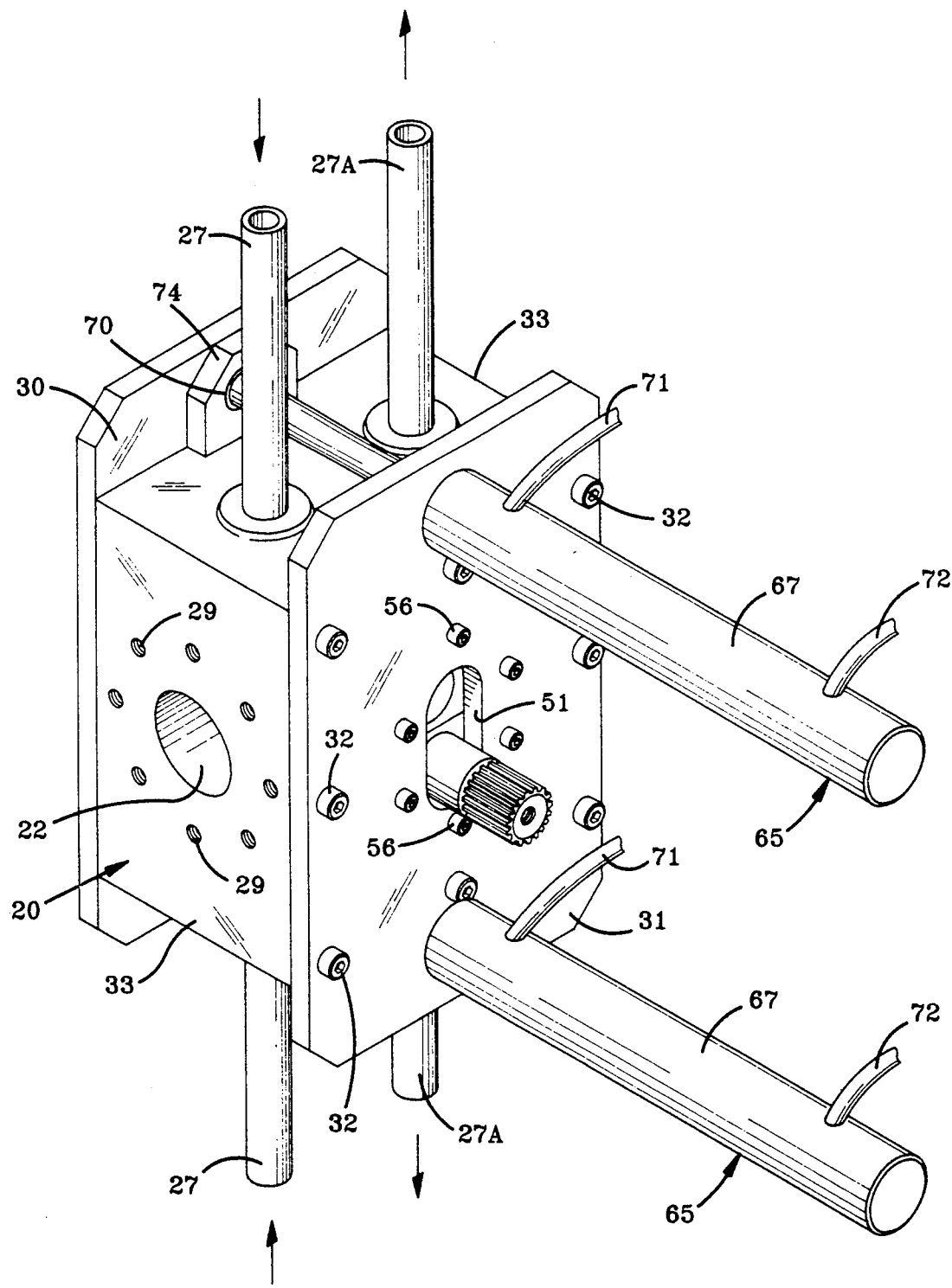
FIG. 2 is an enlarged perspective view of the gear metering pump removed from the system of FIG. 1 shown in a closed position.
Figure 5:
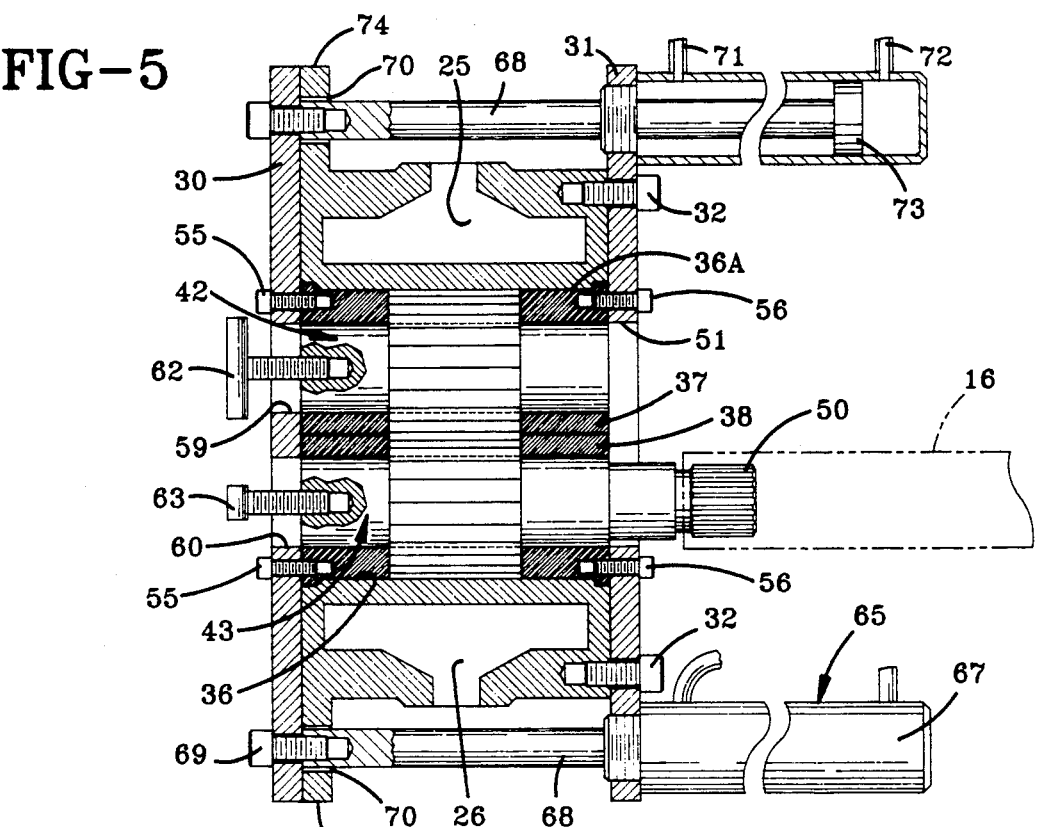
FIG. 5 is a vertical sectional view of the gear metering pump shown in FIGS. 2-4 in closed position.
Figure 6:
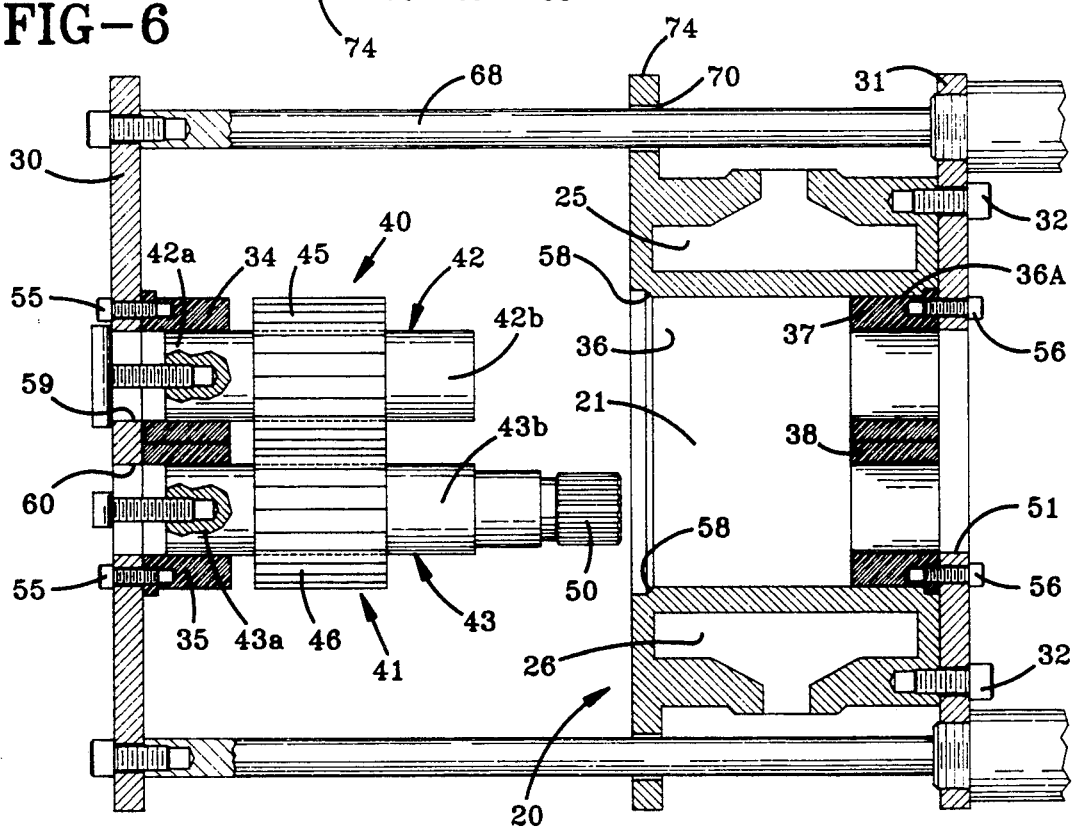
FIG. 6 is a sectional view similar to FIG. 5 with the pump being shown in open position.

Pump 1 of the invention, is shown particularly in FIG. 2-6, and includes a main housing indicated generally at 20, having a hollow interior or chamber 21 (FIGS. 6 and 7). Inlet port 22 and exit or discharge port 23 are formed in ends of the housing and communicate with chamber 21. Various fluid cavities 25 and 26 are formed in housing 20 for circulating cooling or heating fluid throughout the housing. This fluid enters through a plurality of feed lines 27 and leaves through discharge lines 27A. The fluid will either heat or cool the compound being metered by pump 1, which is indicated at 28 in FIG. 7, in order to maintain the compound at a desired temperature to facilitate its movement through the gear pump and prevent it from exceeding an upper temperature limit to prevent vulcanization thereof. A plurality of bolt receiving holes 29 are formed in the opposed end faces 33 (only one of which is shown) of housing 20 for connecting pump 1 to extruder 6 and to extrusion head 5.

Figure 3:
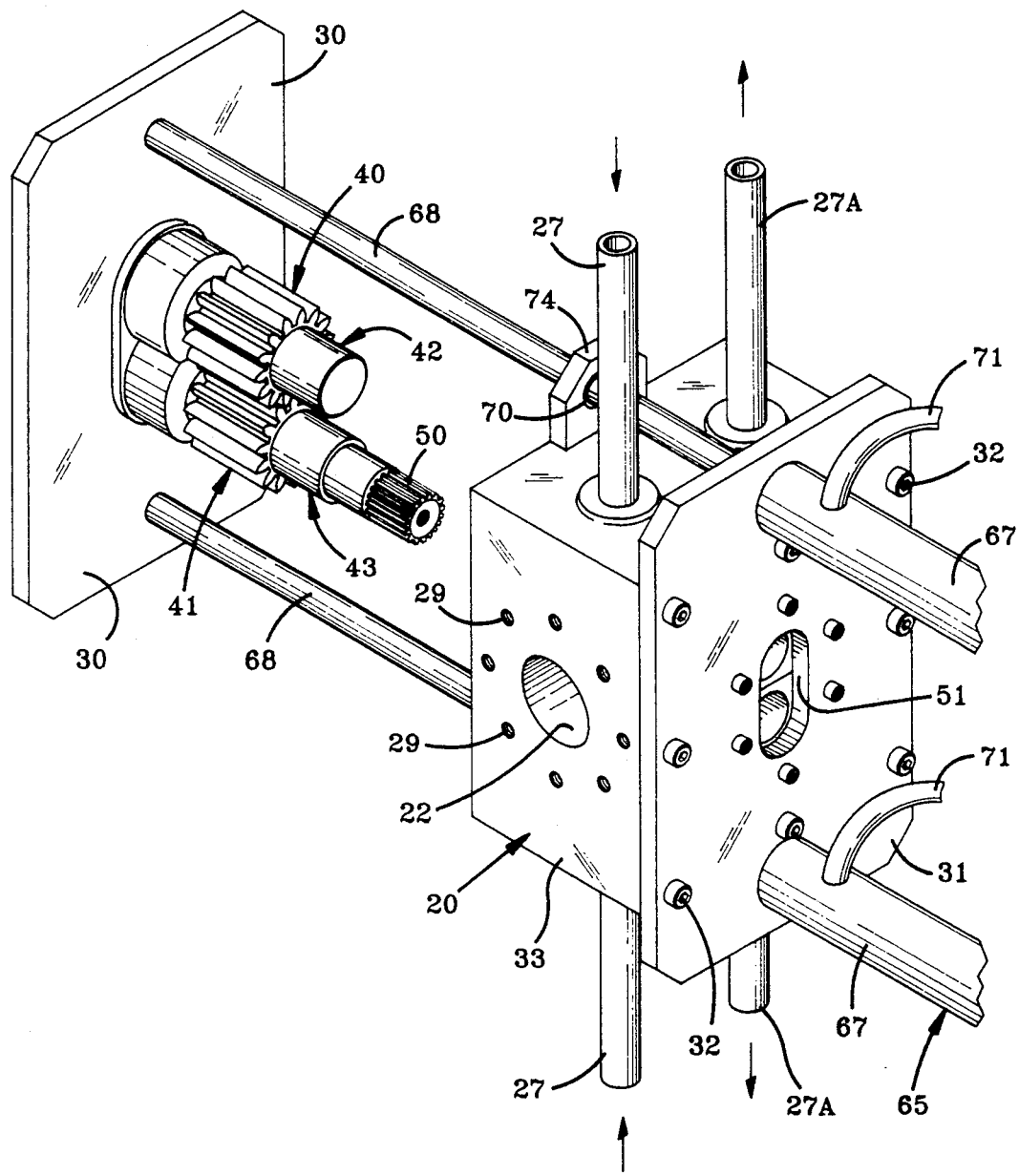
FIG. 3 is a perspective view similar to FIG. 2, with the gear metering pump shown in an open position.
Figure 4:
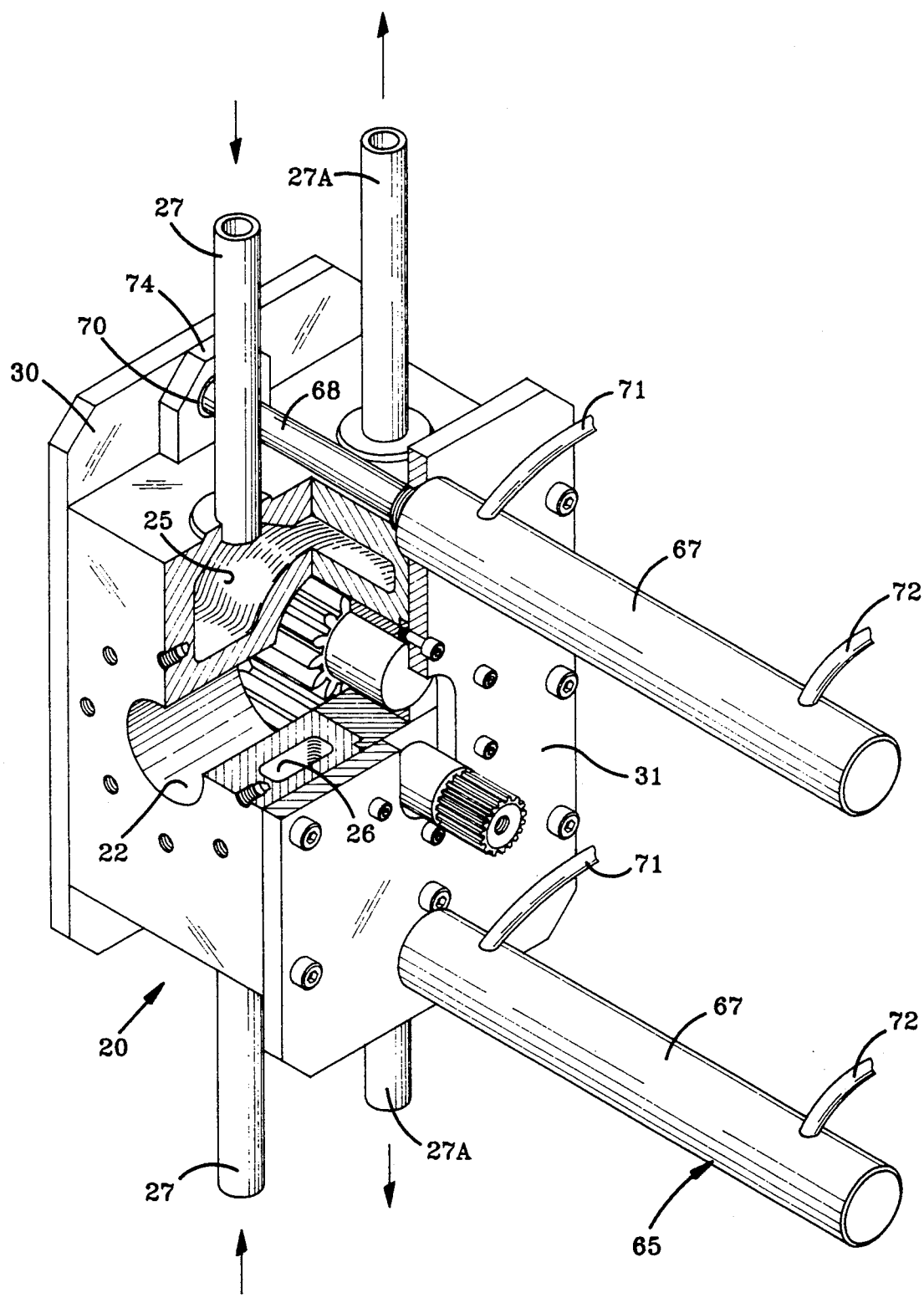
FIG. 4 is a perspective view similar to FIG. 2 with portions broken away.

In accordance with one of the features of the invention, a side plate 30 is removably mounted on one side of housing 20 and closes a side opening 36 of chamber 21. Plate 30 preferably is formed of steel, and has a sufficient thickness to hold a bearing assembly firmly in its designated position. The opposite open side 36A of chamber 21 is closed by a second side plate 31, which is secured to housing 20 by a plurality of mounting bolts 32 (FIGS. 3 and 5). Referring to FIGS. 3, 5 and 6, a bearing assembly consisting of a pair of sleeve bearings 34 and 35, is secured to the inside surface of side plate 30 by a plurality of bolts 55 so as to be removed with the side plate when it is separated from housing 20 as described in greater detail below. A similar bearing assembly formed by sleeve bearings 37 and 38, is mounted on the inside surface of fixed side plate 31 in axial alignment with bearings 34 and 35 by bolts 56.

A pair of meshing gears indicated generally at 40 and 41, is rotatably mounted in chamber 21 by shafts indicated generally at 42 and 43, respectively. The gears are mounted within the end bearing assemblies by shaft ends 42a and 42b, and by ends 43a and 43b, which are rotatably mounted within sleeve bearings 34 and 37, and 35 and 38 respectively, as shown particularly in FIGS. 5 and 6. A plurality of gear teeth 45 and 46 are in meshing engagement for the metered movement of compound 28 thereby as shown particularly in FIG. 7.

Referring to FIG. 7, as gears 40 and 41 rotate, the space between two adjacent teeth fills with compound 28 as it passes the inlet port 22. As the gears continue to rotate, the compound is confined by arcuate inner surfaces 47 and 48 which define a major portion of chamber 21, until the compound reaches discharge port or opening 23 where the teeth of gears 40 and 41 mesh and force the compound out through the outlet opening and into extrusion head 5.

Gear shaft 43 includes an extended end 50 (FIGS. 5 and 6) having coupling teeth formed thereon, for drivingly coupling the shaft to coupler shaft 16 shown in phantom lines in FIG. 5, for positively driving shaft 43 by electric motor 14, which in turn drives driven shaft 42, through the meshing of gear teeth 45 and 46. If desired, the drive shaft can be the shaft of the upper gear without effecting the concept of the invention.

In accordance with another feature of the invention, an enlarged opening 51 is formed in side plate 31 enabling shaft 43 and end 50 thereof, to pass freely therethrough without the use of any positive external seal, as heretofore used in known gearing pump constructions.

The elimination of such an end seal considerably reduces the amount of heat generated, which would be imparted to compound 28 as it flows through chamber 21, possibly resulting in undesirable excessive heating.

In further accordance with the invention, a pair of lubricating outlet openings 59 and 60 (FIGS. 5 and 6) are formed in side plate 30 in axial alignment with shafts 42 and 43, respectively. T-bolts 62 and 63 extends through holes 59 and 60 respectively, and are threadably connected within a threaded opening in shaft ends 42a and 43a. T-bolts 62 and 63 act as cutters for a sleeve of lubricating compound which will flow in a generally tubular configuration out through holes 59 and 60, after passing along usual flow grooves 64 formed in the bearings, as shown particularly in FIGS. 8 and 10, and between the mating shafts and bearing surfaces, when the compound is of the type used for tire innerliner material or the like. Other compounds will form lightweight particles or dry crumbs and need not be cut by T-bolts 62 and 63 after passing through bearing grooves 64 and then out through side plate openings 59 and 60. The heads of T-bolts 62 and 63 will be spaced a short distance from side plate 30 to provide a wide open flow passage through which the dry crumbs, flakes or shavings will pass by the action of gravity. Furthermore, the discharge ends of the bearing annulii are at atmospheric pressure and are not dependent upon pressure to drive the lubricating compound through the openings. Also this spacing enables the shaft ends and gears to be spaced slightly from side plate 30 and the bearing assembly when the gear pump is in the open position as shown in FIG. 6, providing a space sufficient for manually picking and removing any compound from the gear teeth and bearings.

In accordance with another main feature of the invention, a plurality of power actuated pusher/puller means, each of which is indicated generally at 65, are mounted on side plate 31 and are operatively connected to side plate 30 for removing side plate 30, and one pair of bearings and meshing gears 40 and 41, from within housing cavity 21 as shown in FIGS. 3 and 6. Each power means 65 preferably is a hydraulic cylinder 67, which is securely mounted on side plate 31 and has a piston rod 68 which extends outwardly from cylinder 67 and is connected to side plate 30 by a bolt 69. Rods 68 will extend through sleeve bearings 70 mounted in housing extensions 74 to stabilize the movement of side plate 30 with respect to housing 20. Preferably a pair of fluid lines 71 and 72 communicate with each cylinder 67 providing a flow of hydraulic fluid to both sides of internal piston 73 for positively moving piston rod 68 in both the opening and closing directions.

Thus, side plate 30 can be removed easily and automatically from housing 20 by the simultaneous actuation of pistons 73 by the introduction of fluid through lines 72, which will move piston rods 68 and connected side plate 30, to the open position as shown in FIGS. 3 and 6. Movement of side plate 30 will carry along with it gears 40 and 41 and bearing sleeves 34 and 35, automatically removing the gears and bearing from within housing chamber 21. As shown in FIGS. 3 and 6, this enables the compound to be removed easily, generally manually by a worker, from within chamber 21, and enables gears 40 and 41 to be readily accessible for ease of cleaning.

Introduction of pressurized fluid into cylinders 67 through lines 71 will then move piston rods 68 and connected side plate 30, together with gears 40 and 41 and bearing 34 and 35 from the open position of FIG. 6 to the closed position of FIG. 5 afterwhich, shaft end 50 is reconnected either manually or automatically to coupler shaft 16 to complete the driving connection with the power drive source. An annular chamfer 58 (FIG. 6) preferably is formed about side opening 36 to serve as a pilot for slidably receiving gears 45 and 46 within housing chamber 21.

Power opening means 65 preferably will be two or more hydraulic cylinders as discussed above, and would be synchronized by known equipment for driving two or more interconnected hydraulic pumps from a common motor and multiple stream metering valves. In order to avoid cocking during pulling and pushing of the gears because of the tight tolerances, a preferred source of hydraulic power is supplied by a twin metering gear pump which provide equal amounts of hydraulic fluid to each cylinder from separate constant displacement pumps. One example of such pumps is sold under the Trademark Zenith Type B pump, by Parker-Hannifin Corporation of Cleveland, Ohio. However, for holding side plate 30 in the closed position the hydraulic fluid can be valved to a conventional hydraulic supply to reduce usage of the precision pumps.

If desired, mechanical screw jacks can replace the hydraulic cylinders and be driven in unison by a common chain or have synchronous motors fed by the same invertor, to ensure simultaneous uniform movement thereof for removing plate 30 from housing 20.

Side plate 30 as well as side plate 31, are relatively lightweight in contrast to the heretofore gear pump side plates, since they are free of internal channels heretofore required for the flow of lubricating material for the bearings and/or cooling of the gear pump. This provides a more compact, lighter weight and less expensive gear pump than known gear pump constructions. The elimination of these prior art torturous end plate lubrication flow channels is possible due to the relatively large side plate openings 59 and 60 and the elimination of any shaft end seals. Direct communication is always present between the atmosphere and shaft ends 42a and 43a even during discharge of the lubricating compound, in contrast to the prior art gear pumps where discharge is in the form of continuous rods of lubricant moving through discharge ports.

Figure 8:
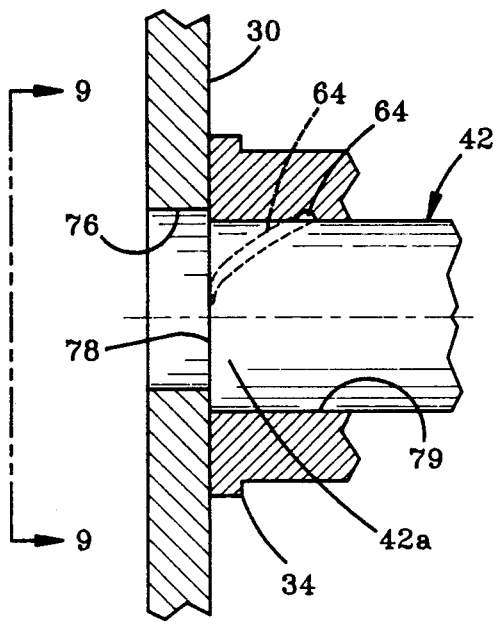
FIG. 8 is a generally diagrammatic sectional view showing the relationship between one of the gear pump shafts and side plate openings to form a stationary cutter mechanism for the elastomeric lubricating material being discharged from the pump housing.
Figure 9:
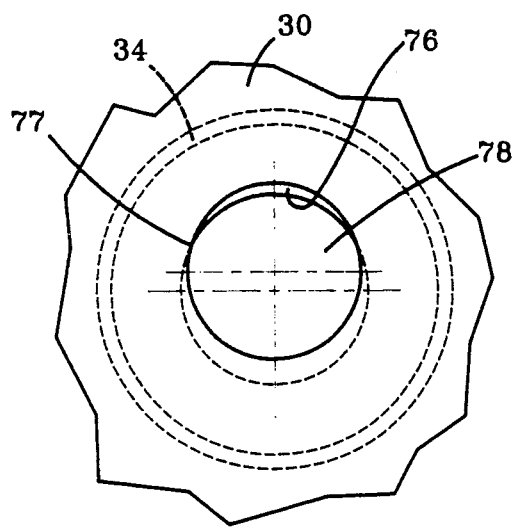
FIG. 9 is a fragmentary end elevational view looking in the direction of arrows 9—9, FIG. 8.

FIGS. 8 and 9 show a modified mounting arrangement of shaft end 42a with respect to an opening 76 which is formed in side plate 30, and which is similar to opening 59. In this arrangement, the diameter of opening 76 may be slightly greater than or less than the diameter of shaft end 42a and is axially offset, thereby providing an arcuate intersection 77 between opening 76 and shaft end surface 78. With this arrangement, the flow of lubricating material which moves along bearing grooves 64 and between an annular space 79 formed between the outer surface of shaft end 42 and the interior annular surface of bearing 34, will begin to move through opening 76 in a rotating motion, and will be severed at the periphery of the discharge opening at arcuate intersection 77. Thus, arcuate intersection 77, due to the eccentric mounting of opening 76 with respect to shaft end surface 78, provides a stationary cutter for severing the lubricating material upon passing through bearing 34, and replaces rotating cutter T-bolts 62 and 63 previously described.

Figure 10:
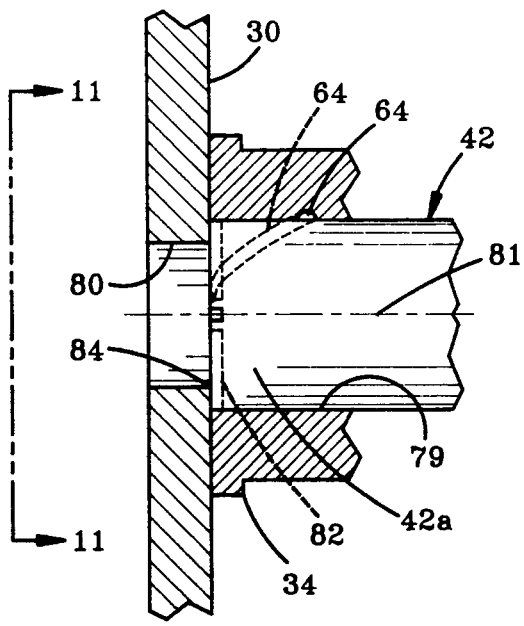
FIG. 10 is a sectional view similar to FIG. 8, showing the formation of another type of rotatable cutter for the elastomeric lubricating material.
Figure 11:
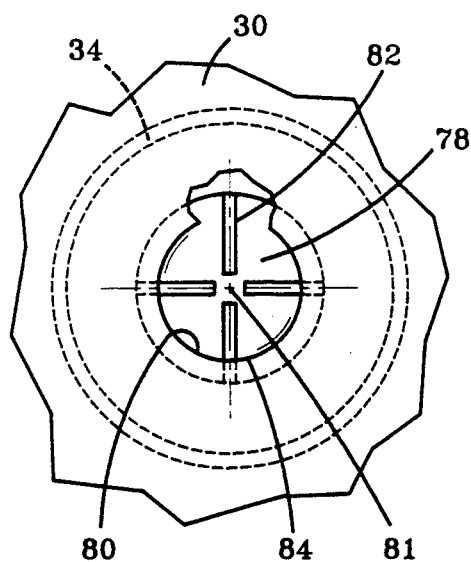
FIG. 11 is a fragmentary end elevational view looking in the direction of arrows 11—11, FIG. 10.

FIGS. 10 and 11 show a type of rotating cutting arrangement for severing the lubricating material as it passes through the bearings and out of a side plate opening 80. In this arrangement, shaft end 42a has a diameter greater than that of side plate opening 80, which may be in axial alignment with shaft axis 81 as opposed to being eccentrically offset therefrom as in FIGS. 8 and 9. The cutting action is provided by a plurality of grooves 82 formed in end face 78 of shaft end 42a. The elastomeric lubricating material, upon passing through bearing grooves 64 and annular space 79, will flow into grooves 82 where it is then cut by circular edge 84 which defines opening 80, adjacent shaft end surface 78. The cut material which is usually in a crumb-like configuration, will drop down the outer face of side plate 30 for collection in a receptacle (not shown) mounted beneath the gear pump.

FIGS. 8-11 show two additional types of cutter mechanisms, one of which is stationary (FIGS. 8 and 9), and the other being a rotatable arrangement (FIGS. 10-11), for severing the lubricating material as it passes through the bearing grooves and annular space formed between the outer surface of shaft 42 and the inner annulus of bearing 34. These same types of cutting mechanisms also will be formed adjacent the end of shaft 43.

In accordance with another feature of the invention, it has been determined that by maintaining the area of the side plate openings 59, 60, 76 and 80 within the range of 50% to 110% of the size of the area of the aligned end surfaces of shafts 42 and 43, it will provide a sufficiently large discharge opening which is in direct communication with the shaft end surfaces, so that the elastomeric lubricating material will not completely fill the discharge openings at any time. The side plate openings may be in true coaxial alignment with the shaft axii, or in a general axial or slightly eccentric alignment therewith. This sizing prevents plugging of the discharge openings as occurs in prior art gear pumps having small material discharge ports or torturous discharge port paths. This direct communication of the side plate openings and the general axially alignment with the end surfaces of the gear shafts, in combination with either a stationary or rotating cutting mechanism, ensures that the elastomeric lubricating material passes freely out of the gear pump housing and into the surrounding atmosphere for collection in a discharge receptacle mounted beneath the gear pump.

Accordingly, the improved gear metering pump of the invention reduces both the cost, weight and size of prior gear metering pumps by replacing the heretofore expensive machined and bulky side plates used with such prior gear pumps, with flat, relatively thin steel plates. These side plates only require the drilling of a plurality of holes therethrough since they eliminate the torturous return lubrication passages heretofore required in the end plates. Also, these side plates reduce cost by eliminating the positive end seal for the drive shaft of the gears heretofore required, and which also eliminates heat buildup in the compound created by the use of such shaft end seals. The elimination of this heat buildup also reduces the possibility of scorching the compound both within the main flow stream and within the lubrication discharge openings. The improved metering pump furthermore can be disassembled easily by the actuation of the side plate pullers/pushers which automatically separates side plates 30 from the main housing, removing with it the meshing gears and one bearing assembly, providing easy access to the housing cavity and the removed gears for cleaning.

Accordingly, the gear metering pump is simplified, provides an effective, safe, less costly, and efficient device which achieves all the enumerated objectives, provides for eliminating difficulties encountered with prior pumps, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved gear metering pump is constructed and used, the characteristics of the construction, and the advantageous, new and useful results obtained; the new and useful structures, devices, elements, arrangements, parts and combinations, are set forth in the appended claims.

We claim:

1. A gear metering pump for compounded elastomeric material including:
   a) a housing having first and second side plates, an internal gear chamber, a material inlet and an outlet communicating with said chamber, with said first side plate being removably mounted on the housing and enclosing an open side of the chamber;
   b) a pair of external meshing gears rotatably mounted on the first side plate and located within the chamber for moving a metered amount of the compounded material from the inlet to the outlet of the chamber;
   c) first and second bearing means mounted on the first and second side plates, respectively, for rotatably mounting the pair of gears within the chamber;
   d) power means connected to the first side plate for removing said first side plate from the housing and for removing the gears and first bearing means from within the chamber upon actuation of said power means, to provide access to the gears and housing chamber;
   e) means for maintaining the gears in the first bearing means on the first side plate upon removal of said first side plate from the housing; and
   f) opening means communicating with certain of the bearing means for enabling a controlled quantity of the compounded material to pass through said certain bearing means and out of said opening means for lubricating said bearing means.

2. The metering pump defined in claim 1 in which the second side plate is mounted on the housing opposite of the first side plate and encloses another open side of the chamber.

3. The metering pump defined in claim 2 in which the power means is a fluid pressure cylinder mounted on the second side plate and has a pressure actuated piston connected to the first side plate for removing said first side plate from the housing.

4. The metering pump defined in claim 3 in which a positive fluid pressure is applied to the pistons for maintaining the first side plate in a closed position with respect to the housing.

5. The metering pump defined in claim 2 in which each of the gears has a shaft; in which the bearing means includes first and second sleeve bearing assemblies; in which the first sleeve bearing assembly is mounted on the first side plate for rotatably mounting an end of each of the gear shafts thereon; and in which the second sleeve bearing assembly is mounted on the second side plate for rotatably supporting other ends of the gear shafts thereon.

6. The metering pump defined in claim 5 in which one of the shafts is a drive shaft and is adapted to be connected to an external power drive source for positively rotating said one shaft; in which the other of said shafts is an idler shaft and is driven by the drive shaft through the meshing gears; in which a drive shaft opening is formed in the second side plate; and in which the drive shaft passes freely through said shaft opening free of any seal with the second side plate.

7. The metering pump defined in claim 1 in which the bearing means are sleeve bearings.

8. A gear metering pump for an elastomeric material including:
   a) a housing having an internal gear chamber and a material inlet and an outlet communicating with said chamber;
   b) a pair of meshing gears rotatably mounted within the chamber for moving a metered amount of elastomeric material through the chamber and out of the outlet thereof, each of said gears having a shaft, one of which is adapted to be connected to an external power drive source;
   c) spaced bearing means mounted within the housing for rotatably mounting the gear shafts within the chamber;
   d) opening means formed in the housing adjacent certain of the shafts to enable a quantity of the elastomeric material to pass between the shafts and the bearing means and directly out of the housing through said opening means for lubricating said bearing means; and
   e) cutter means located adjacent the opening means for cutting the elastomeric material as it passes out of the housing through said opening means after lubricating the bearing means, wherein at least an end of one of the gear shafts is eccentrically mounted with respect to the opening means and has a diameter larger than certain portions of the opening means to provide an intersection between an edge of the opening means and said shaft end to form the cutter means.

9. The gear metering pump defined in claim 8 in which the opening means is a pair of circular openings axially aligned with ends of the shafts; and in which the gear shaft ends have diameters larger than the diameters of the circular openings to provide arcuate intersections between the shaft ends and edges of the circular openings to form the cutter means.

10. The gear metering pump defined in claim 8 in which the opening means has an area within the range of 50% and 110% of the area of the end surfaces of the gear shafts.

11. A gear metering pump for an elastomeric material including:
   a housing having an internal gear chamber and a material inlet and an outlet communicating with said chamber;
   a pair of meshing gears rotatably mounted within the chamber for moving a metered amount of elastomeric material through the chamber and out of the outlet thereof, each of said gears having a shaft, one of which is adapted to be connected to an external power drive source;

spaced bearing means mounted within the housing for rotatably mounting the gear shafts within the chamber;

openings formed in the housing adjacent certain of the shafts to enable a quantity of the elastomeric material to pass between the shafts and the bearing means and directly out of the housing through said openings for lubricating said bearing means;

cutter means located adjacent certain of the openings for cutting the elastomeric material as it passes out of the housing through said certain openings after lubricating the bearing means;

at least one of the gear shaft ends being eccentrically mounted with respect to its respective housing opening and having a diameter larger than said one housing opening; and an edge of said one housing opening forming the cutter means which is stationary for the elastomeric material as it passes through said one opening.

* * * * *